(12) United States Patent
Na

(10) Patent No.: US 6,226,276 B1
(45) Date of Patent: May 1, 2001

(54) TDD DIGITAL RADIO COMMUNICATION SYSTEM AND METHOD FOR OPERATING THE SAME

(75) Inventor: Bo-Gyu Na, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/100,928

(22) Filed: Jun. 22, 1998

(30) Foreign Application Priority Data

Jun. 21, 1997 (KR) ................................. 97-26368

(51) Int. Cl.[7] ........................................ H04L 5/14

(52) U.S. Cl. ............................. 370/294; 455/76; 455/83; 455/86

(58) Field of Search ................................. 370/280, 279, 370/294, 293; 455/83, 86, 76

(56) References Cited

U.S. PATENT DOCUMENTS

| | | | |
|---|---|---|---|
| 4,447,792 | * 5/1984 | Wynn | 332/19 |
| 5,276,913 | * 1/1994 | Lee et al. | 455/76 |
| 5,339,309 | * 8/1994 | Saito | 370/29 |
| 5,511,236 | * 4/1996 | Umstattd et al. | 455/76 |

* cited by examiner

*Primary Examiner*—Hassan Kizou
*Assistant Examiner*—Thien Tran
(74) *Attorney, Agent, or Firm*—Robert E. Bushnell, Esq.

(57) ABSTRACT

A TDD digital radio communication system includes a local oscillator for generating a local oscillation frequency being N times the transmission intermediate frequency and a frequency divider for dividing the local oscillation frequency by N. The frequency divider is enabled in the transmission mode to generate the transmission intermediate frequency and is disabled in the reception mode to completely stop generating the transmission intermediate frequency, so as to prevent interference with the reception intermediate frequency.

9 Claims, 4 Drawing Sheets

US 6,226,276 B1

TDD DIGITAL RADIO COMMUNICATION SYSTEM AND METHOD FOR OPERATING THE SAME

CROSS-REFERENCE TO RELATED APPLICATION

This application make reference to, incorporates the same herein, and claims all benefits accruing under 35 U.S.C. §119 through my patent application entitled TDD DIGITAL RADIO COMMUNICATION SYSTEM AND METHOD FOR OPERATING THE SAME earlier filed on Jun. 21, 1997 in the Korean Industrial Property Office, and there regularly assigned Ser. No. 26368/1997.

BACKGROUND OF THE INVENTION

1. Field of the Invention

The present invention relates to digital radio communication systems generally, and, more particularly, to time division multiplex digital radio communication systems and to process of operating time division multiples digital radio communication systems.

2. Description of the Related Art

In a time division duplex (TDD) digital radio communication system such as the cordless telephone second generation (i.e., CT-2), a transmission carrier frequency is identical to a reception carrier frequency. The time division multiples digital radio communication system alternates transmission and reception at intervals of specific times. Hence, the transmission intermediate frequency is also identical to a reception intermediate frequency, so that during reception, a signal source for the transmission intermediate frequency may cause interference with the reception intermediate frequency. In order to eliminate this interference, a conventional time division duplex digital radio communication system disables (or turns to an operationally off state) an radio frequency receiver during the transmission mode and disables the radio frequency transmitter during the reception mode.

In contemporary designs of time division duplex digital radio communication system, a first local oscillation frequency is used for both the transmission and reception, to generate the transmission intermediate frequency. The local oscillator however, generates harmonic components with substantial amplitudes. Although the Time Division Multiple Access Time Division Duplex Type Transmitter-Receiver of Y. Hirose, U.S. Pat. No. 5,598,405 advocates placing the phase locked loop in an off state at all times (including the transmission time slot and the reception time slot) other than time slots just before the transmission time slot and the reception time slot, I have found that it is not feasible to enable and disable the local oscillator during the transmission and reception modes principally because of the gross disparity between the guard times between the transmission and the reception, and the switching stabilization (or settling) time of the local oscillator, and the phase locked loop oscillator—the switching stabilization time for the local oscillator is over ten times the guard time of the digital radio communication system, so that it is not feasible to turn the local oscillator on and off in correspondence with the transmission and reception modes.

Generally, it is desirable to maintain a possible reception sensitivity between −100 dBm and −108 dBm in a time division duplexer digital radio communication system by the expedient of maintaining interference signals between −113 dBm and −121 dBm. It is very difficult to restrict the third harmonic signals contained in the output of the local oscillator below −30 dBm. Thus, it is necessary to maintain an isolation degree of over about 90 dB, which is, however, unattainable due to the circuitry and spatial limitations. In addition, in conventional digital radio communication systems and applied to a voltage controlled oscillator. Since the first local oscillation frequency is used in common for transmission and reception, it must be activated in both the transmission mode and the reception mode because the reception frequency should be identical to the transmission frequency as long as the frequency error is not generated. A phase locked loop for generating the first local oscillation frequency is always closed so that the voltage controlled oscillator is controlled by a phase locked loop frequency synthesizer. When the input transmission data is applied to the voltage controlled oscillator, the loop bandwidth of the phase locked loop is limited in both the high frequency band and the low frequency band. If the loop bandwidth of the frequency synthesizer increases over about 10 KHz, distortion due to the noise and pseudo signal in the loop also increases. Further, if distortion is decreased below several hundreds of Hertz, the stability of the loop is adversely reduced, so that the frequency and phase locked status will not be attained and the drift noise increased. Moreover, if a single point modulation is performed onto the voltage controlled oscillator in the phase locked loop, the loop response to the modulation signal exhibits a highpass filter feature which attenuates the low frequency signals. Accordingly, in order to increase the bandwidth responsive to the modulation signal, the design of contemporary systems suggests that the loop bandwidth should be reduced to the minimum value, a contradictory requirement. As the result, the modulated transmission signal may be attenuated and distorted at the low frequency band. Conventional isolation techniques such as that of D. E. Fague in U.S. Pat. No. 5,515,364 for a Radio Frequency Telecommunications Transceiver, and that found in U.S. Pat. No. 5,553,317 for a Quadrature Modulator For TDMA/TDD Radio Communication Apparatus of T. Hara, have been limited to the design of the circuit itself, while other designs have focused upon the printed circuit board, and the mechanism of the circuit, with an undesirably increase the size, power consumption, and material costs of the system.

SUMMARY OF THE INVENTION

It is therefore an object of the present invention to provide an improved time division duplex digital radio communication system.

It is another object to provide a circuit and process for operating a time division duplex digital radio communication system able to quickly stabilize the transmission intermediate frequency during the transmission mode and to completely isolate the transmission intermediate frequency during the reception mode.

It is still another object to provide a circuit and process for operating a time division duplex digital radio communication system using a local oscillator for generating a local oscillation frequency that is N times the transmission intermediate frequency and a frequency divider for dividing the local oscillation frequency by N, with the frequency divider being enabled during the transmission mode to generate the transmission intermediate frequency and being disabled during the reception mode to completely stop generating the transmission intermediate frequency, so as to prevent interference with the reception intermediate frequency.

It is yet another object to provide a circuit and process for operating a time division duplex digital radio communication system using a phase locked loop circuit serving as a second local oscillator, with the phase locked loop circuit being opened to generate a free running frequency during the transmission mode, the free running frequency being synthesized with transmission data to generate a modulated transmission signal, and the phase locked loop circuit being closed during the reception mode in order to maintain stability of the loop.

These and other objects may be achieved in accordance with the principles of the present invention with a time division duplex digital radio communication system including a first local oscillator generating a first local oscillation frequency signal being applied in common to a transmitter and a receiver; a second local oscillator generating a second local oscillation frequency which is N times a reception intermediate frequency; a frequency divider generating a transmission intermediate frequency that is identical to the reception intermediate frequency by dividing the second local oscillation frequency by N; and frequency mixer generating a transmission carrier frequency by mixing an output of the frequency divider with an output of the first local oscillator. The frequency divider is enabled during a transmission mode to generate the transmission intermediate frequency, and is disabled during a reception mode to stop the generation of the transmission intermediate frequency. Preferably, the second local oscillator is a phase locked loop.

There is also provided a time division duplex digital radio communication system including a transmitter with a local oscillator generating a local oscillation frequency signal; a phase detector detecting a phase and frequency error signal between a reference frequency and an oscillation frequency; a loop filter lowpass filtering the error signal to generate a DC voltage; and a loop switch interconnected between the phase detector and the loop filter; a voltage controlled oscillator generating a frequency according to the DC voltage output from the loop filter and frequency-modulating transmission data input in a transmission mode in order to output a modulated transmission signal. A frequency mixer mixes the local oscillation frequency signal with the modulated transmission signal. The loop switch is operationally opened during the transmission mode to allow the voltage controlled oscillator to generate a free running frequency, and is closed during the reception mode to allow the voltage controlled oscillator to revert to a frequency and phase locked status.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
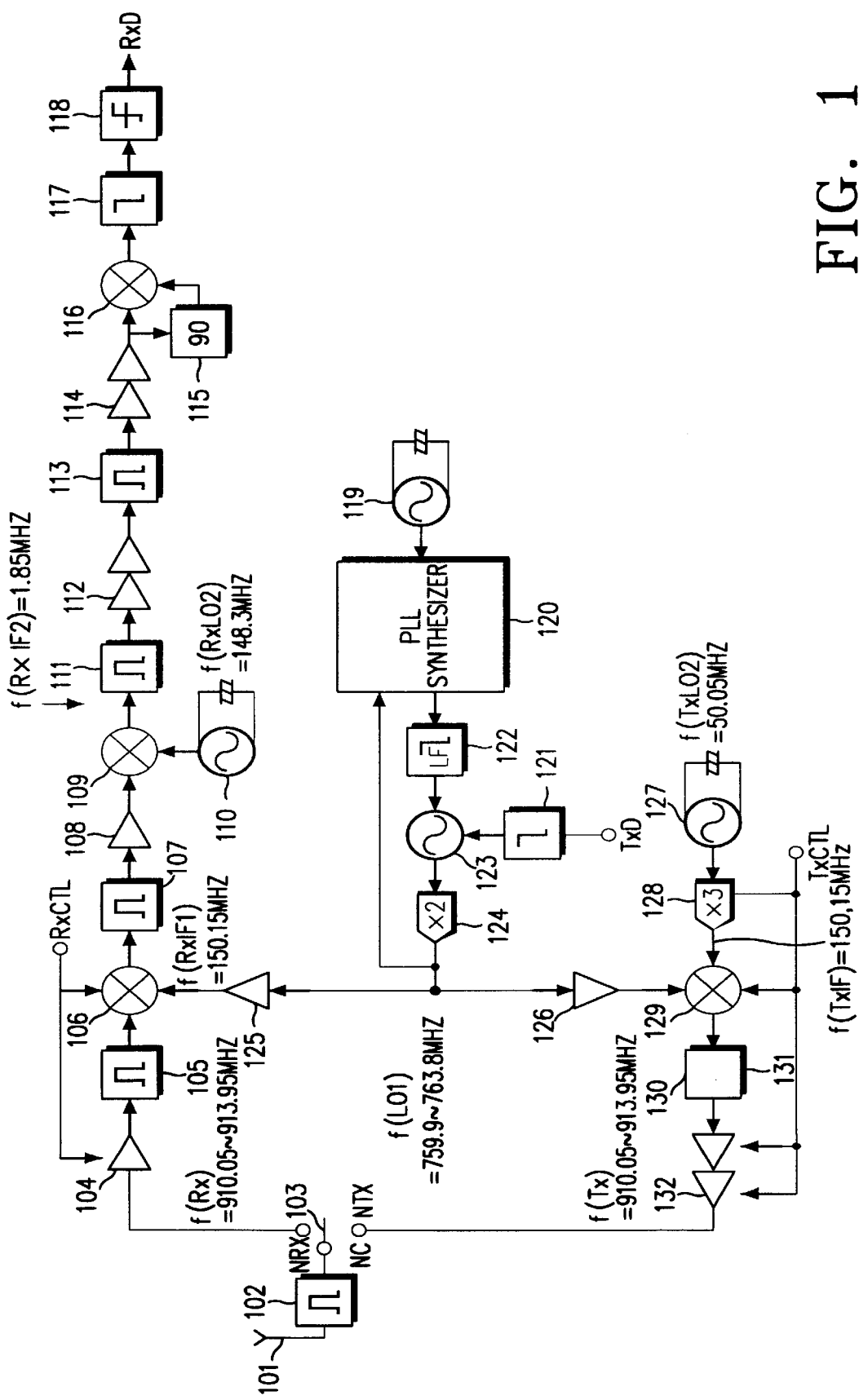
FIG. 1 is a block diagram of a time division duplex digital radio communication system.

FIG. 1 is a drawing illustrating the salient features of a conventional TDD digital radio communication system, in which frequencies at the respective stages are given by way of a working example in order to better illustrate the principles of the present invention. The transmission carrier frequency f(Tx) and a reception carrier frequency f(Rx) transmitted to and received from an antenna 101 both are at 910.05–913.95 megaHertz, which is employed for CT-2 service within the Republic of Korea. In addition, the intermediate frequencies and the oscillation frequencies are given in the drawing by way of example, and refer to those used in the CT-2 system manufactured by SamSung Electronics Co., Ltd.

In the circuit shown in FIG. 1, during the reception mode, high frequency switch 103 switches a common node NC to a reception node NRx to form a reception channel for the reception carrier frequency f(Rx) signal received at antenna 101. During the transmission mode, switch 103 switches common node NC to transmission node NTx to form a transmission channel for the transmission carrier frequency f(Tx) signal. Here, switch 103 is controlled in response to a switching control signal periodically generated by a controller (not shown) at intervals of a predetermined time (e.g., 2 millisecond intervals in this application) with a duty rate of 50:50 (i.e. the first one millisecond is allocated for the Tx mode and the next one millisecond is allocated for the Rx mode). During the transmission mode, the controller activates a transmission mode control signal TxCTL and inactivates a reception mode control signal RxCTL, in interlocking synchronism with the switching operation of switch 103. On the contrary, in the reception mode, the controller activates the reception mode control signal RxCTL and inactivates the transmission mode control signal TxCTL.

A time division duplex digital radio communication system of the type illustrated by FIG. 1 uses a first local oscillation frequency f(LO1) of 759.9–763.8 megaHertz for both transmission and reception, wherein the system is, for example, controlled so that the receiver operates for the first millisecond of an interval of one millisecond and the transmitter operates for the next millisecond of an interval of one millisecond, repeatedly. The time division duplex digital radio communication system uses local oscillator 127 and a x3 frequency multiplier (ie., a multiply-by-3 circuit) 128 to generate the transmission intermediate frequency f(TxIF), and disables the frequency multiplier 128 in the reception mode. That is, the local oscillator 127 generates a local oscillation frequency f(TxLO2) of 50.05 MHz which is one-third-times the transmission intermediate frequency f(TxIF). In the transmission mode, frequency multiplier 128 is enabled in response to the transmission mode control signal TxCTL to generate the transmission intermediate frequency f(TxIF) of 150.15 MHz by multiplying the local oscillation frequency f(TxLO2) by a factor of three. Frequency multiplier 128 is disabled during the reception mode in order to prevent generation of the transmission intermediate frequency f(TxIF) which interferes with the reception intermediate frequency f(RxIF1) during reception. Even if frequency multiplier 128 is disabled, local oscillator 127 itself generates harmonic components with a specific amplitude; in particular, the second and third harmonics of local oscillator 127 have significant amplitudes. Thus, although frequency multiplier 128 is disabled, these harmonic signals are not completely eliminated from the output of the frequency multiplier 128, and contribute to distortion. Moreover, it is impossible to enable and disable local oscillator 127 during the transmission and reception modes, because a guard time between the transmission and the reception modes is extremely short, typically on the order of merely several tens of microsecond, whereas a switching stabilization (or settling) time of local oscillator 127 is in the range of between several hundreds of microsecond and several milliseconds. That is, the switching stabilization time is several hundreds microseconds for local oscillator 127, and several milliseconds for a phase locked loop (PLL) oscillator. Therefore, the switching stabilization time of local oscillator 127 is over ten times the guard time of the time division duplex digital radio communication system, so that it is impossible to turn on and off local oscillator 127 according to the transmission and reception modes in the type of circuit represented by FIG. 1.

A conventional digital radio communication system such as that represented by FIG. 1 has a possible reception sensitivity of between −100 dBm and −108 dBm. In order to obtain this level of reception sensitivity, any interference signal should be maintained between −113 dBm and −121 dBm. It is very difficult however, to restrict the third harmonic sionals contained in the output of local oscillator 127 below −30 dBm. Thus, it is necessary to maintain a degree of isolation of over about 90 dB, which is, however, unattainable due to the particular circuitry and to spatial limitations. Thus, I have found that in order to prevent deterioration of the reception sensitivity due to the presence of interference, local oscillator 127 should be so designed as not to generate harmonic signals and frequency multiplier 128 should be so designed as to provide a higher degree of isolation. Moreover, I have noticed that it is necessary to pay close attention in order to choose a medium for the printed circuit board (PCB) bearing the circuit and to the arrangement and shielding scheme in order to provide a circuit that rarely generates electromagnetic waves in the empty space on the printed circuit board. Nevertheless, conventional techniques have been limited to the design of the circuit, the printed circuit board, and the mechanism, and undesirably increase the size, power consumption, and material costs of the system.

Figure 2A:
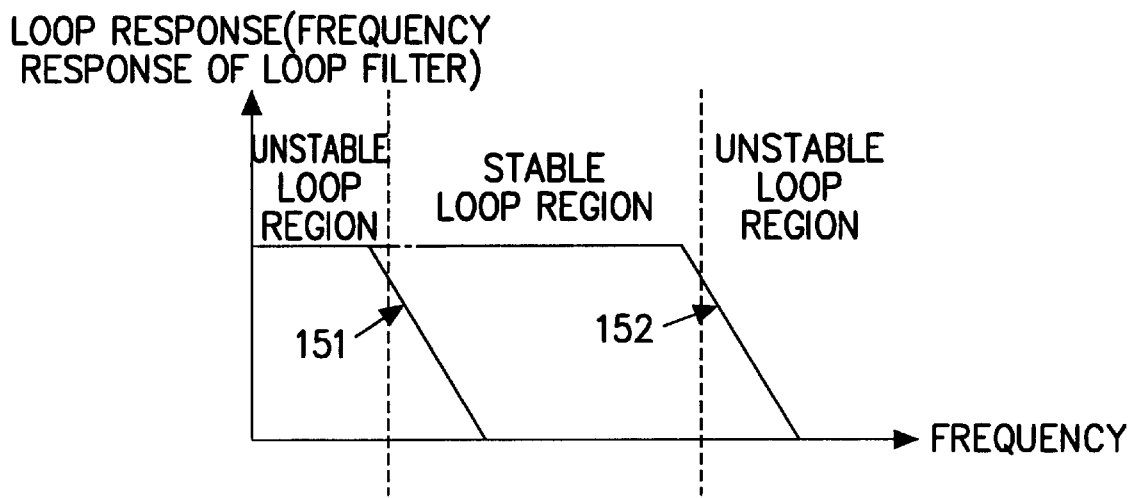
FIG. 2A is a two coordinate graph illustrating the loop bandwidth characteristics of a phase locked loop for a first local oscillator used in the digital radio communication system of FIG. 1, with amplitude shown as a function of frequency.
Figure 2B:
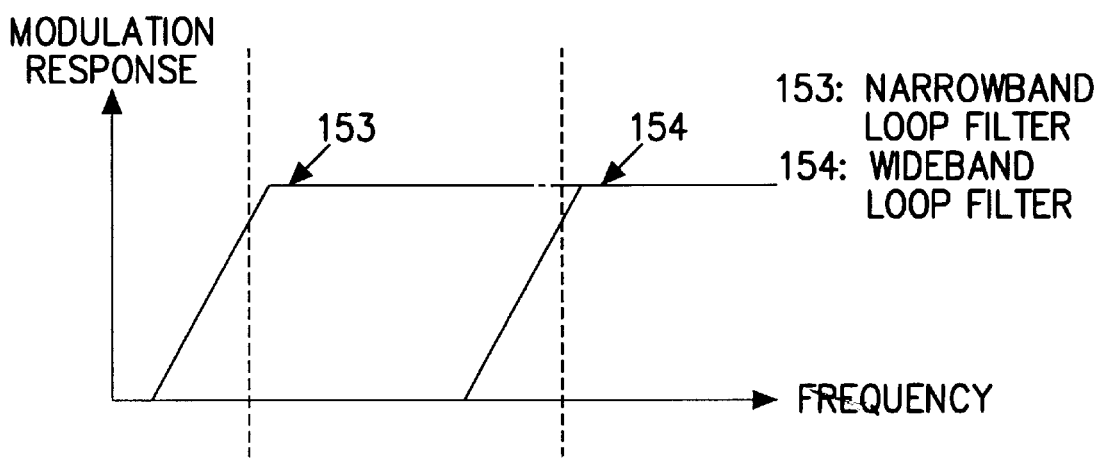
FIG. 2B is a diagram illustrating possible modulation bandwidth characteristics according to modulation modes, with amplitude shown as a function of frequency.

In addition, in conventional digital radio communication systems, input transmission data TxD is filtered by lowpass filter 121 and is applied to voltage controlled oscillator 123, which generates a signal at ½ of the frequency of a first local oscillation frequency f(LO1), and is frequency-modulated at this ½ frequency. Since the first local oscillation frequency f(LO1) is used in common for transmission and reception however, the first local oscillator should be activated in both the transmission mode and the reception mode because the reception frequency should be identical to the transmission frequency as long as no frequency error is generated. A phase locked loop for generating the first local oscillation frequency f(LO1) is always closed however, so that voltage controlled oscillator 123 should be controlled by phase locked loop frequency synthesizer 120. When the input transmission data TxD is applied to voltage controlled oscillator 123 however, the loop bandwidth of the phase locked loop has limitations both in the lower frequency band and in the higher frequency band, as is shown by the lower frequency cutoff 151 and the higher frequency cutoff 152 in FIG. 2A. For example, voltage controlled oscillator 123 should generate a signal at ½ of the frequency of the first local oscillation frequency f(LO1) at intervals of 100 KHz within the limits of 759.9–763.8 MHz. If the loop bandwidth of frequency synthesizer 120 increases to over about 10 KHz however, the distortion due to the noise and pseudo signal in the loop also increases. If the loop bandwidth is decreased below several hundreds of Hertz, the stability of the loop is lowered, so that either the frequency and phase locked status may not be attained or the drift noise may increase. If a single point modulation is performed on voltage controlled oscillator 123 in the phase locked loop, a loop response to the modulation signal between the narrowband loop filter response 153 and the wideband loop filter response 154, shows a highpass filter feature which attenuates the low frequency signals, as is illustrated by FIG. 2B. Accordingly, I have found that in order to increase the bandwidth responsive to the modulation signal, the loop bandwidth should be reduced to a minimum value, which is contradictory. As the result, the modulated transmission signal may be attenuated and distorted at the low frequency band.

Figure 3:
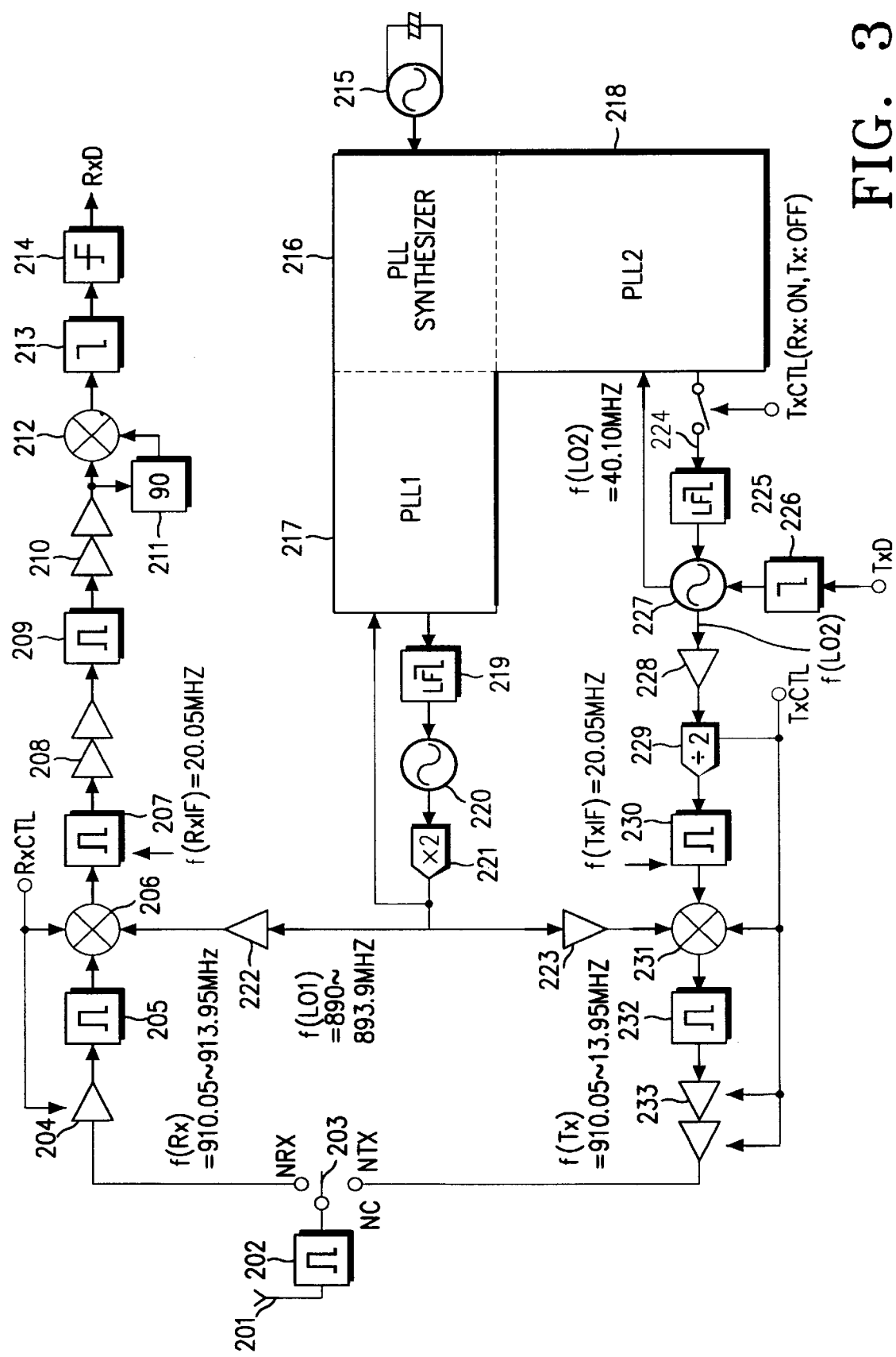
FIG. 3 is a block diagram of a time division duplex digital radio communication system constructed as an embodiment of the present invention.

FIG. 3 illustrates a block diagram of a TDD digital radio communication system according to an embodiment of the present invention, in which the frequencies at the respective stages are shown by way of example, based on the CT-2 service implemented in the Republic of Korea. The present invention is directed to preventing the harmonic signals derived from the output of a second local oscillator from deteriorating reception sensitivity of a receiver. To do so, the invention system generates a local oscillation frequency being N times a transmission intermediate frequency and then divides the local oscillation frequency by N to generate the transmission intermediate frequency. Then, the system enables the frequency divider in the transmission mode and disables the frequency divider in the reception mode, thereby to fundamentally eliminate interference signals. This is based on the fact that the harmonic distortion is generally caused by active elements, whereas the subharmonic distortion is not theoretically caused by an ordinary elements other than a specific circuit such as the frequency divider. Further, the invention system includes a phase locked loop circuit serving as the second local oscillator. During transmission, the phase locked loop circuit serving as the second local oscillator is opened to generate the free running frequency and the second local oscillator modulates the transmission data at the free running frequency. During reception, the phase locked loop circuit is closed so that the second local oscillator is controlled by the loop, thereby preventing the drift noses which may be caused by the free running frequency. Since the phase locked loop circuit is opened during transmission, the band characteristics for the modulation signal is not restricted so that the center frequency is stabilized, thus improving the modulation characteristics.

Referring to FIG. 3, in the reception mode, a carrier frequency signal captured by an antenna 201 is input to a bandpass filter 202 which passes filers the input signal to output the reception carrier frequency signal f(Rx) to a high frequency switch 203. Here, it is assumed that the reception carrier frequency signal f(Rx) is 910.05–913.95 MHz. The switch 203 has a common node NC which is switched to a reception node NRx in the reception mode to transfer the input reception carrier frequency signal f(Rx) to a low noise amplifier 204.

The low noise amplifier 204 amplifies the input reception carrier frequency signal f(Rx), suppressing the noises. An image eliminating filter 205 filters the output of the low noise amplifier 204 to eliminate the image signals from the amplified reception carrier frequency signal. A frequency mixer 206 mixes the output signal of the image eliminating filter 205 with a first local oscillation signal f(LO1) output from an isolating buffer 222 to generate a reception intermediate frequency f(RxIF) to a channel bandpass filter 207. Here, it is assumed that the reception intermediate frequency f(RxIF) is 890–893.9 MHz. The bandpass filter 207 eliminates the pseudo signal of another channel and the other channel signal in the same band from the reception intermediate frequency f(RxIF) output from the mixer 206, so as to output the reception intermediate frequency of only the self channel to a multistage amplifier 208. Here, the reception intermediate frequency f(RxIF) is 20.05 MHz. The multistage amplifier 208 amplifies the intermediate frequency signal f(RxIF) with a specific gain. A bandpass filter 209 eliminates the noises or the pseudo signal caused by the multistage amplifier 208. A multistage amplifier 210 amplifies the intermediate frequency f(RxIF) output from the bandpass filter 209 with a specific gain, and outputs its output signal in common to a frequency discriminator 212 and a phase shifter 211. The phase shifter 211 delays the amplified intermediate frequency by 90° and applies its output to the frequency discriminator 212. The frequency discriminator 212 multiplies the output of the multistage amplifier 210 by the output of the phase shifter 211, thereby to perform frequency modulation. The frequency discriminator 212 converts the frequency modulated signal to a voltage difference signal. A lowpass filter 213 eliminates the intermediate frequency signal and its harmonic signals from the frequency modulated signal, to pass the baseband signals only. A bit shapper 214 shapes (or converts) the baseband signal into a digital signal in the form of a square wave, and outputs demodulated reception data RxD to a logic circuit (now shown).

The first local oscillator generates a first local oscillation frequency f(LO1) which is applied in common to the frequency mixer 206 in the receiver and a frequency mixer 231 in the transmitter. Specifically, a voltage controlled oscillator 220 generates a ½ frequency of the first local oscillation frequency f(LO1). It is assumed that the output frequency of the voltage controlled oscillator 220 is 445–446.95 MHz (i.e., a half frequency of the first local oscillation frequency f(LO1)). A frequency multiplier (or a multiply-by-2 circuit) 221 multiplies the output frequency of the voltage controlled oscillator 220 by two to generate the first local oscillation frequency signal f(LO1) which is applied in common to the isolating buffer 222, an isolating buffer 223, and a first phase locked loop 217 in a dual phase locked loop frequency synthesizer 216. The first local oscillation frequency signal f(LO1) is 890–893.9 MHz. The first phase locked loop 217 divides the first local oscillation frequency f(LO1) by a predetermined division ratio and compares it with a reference frequency output from a reference oscillator 215 to detect a phase and frequency error signal therebetween. A loop filter 219 lowpass-filters (or smooths) the error signal output from the first phase locked loop 217 to generate a DC voltage to the voltage controlled oscillator 220. Then, the voltage controlled oscillator 220 generates its output frequency according to the DC voltage, so as to allow a stable generation of the first local oscillation frequency f(LO1).

As to a second local oscillator in the transmitter, a voltage controlled oscillator 227 generates a second local oscillation frequency f(LO2) which is N times the transmission intermediate frequency f(TxIF). In accordance with an embodiment of the present invention, the second local oscillation frequency f(LO2) generated from the voltage controlled oscillator 227 is twice the transmission intermediate frequency f(TxIF), i.e., 40.10 MHz. The output of the voltage controlled oscillator 227 is applied in common to an isolating buffer 228 and a second phase locked loop 218 in the dual phase locked loop frequency synthesizer 216. The second phase locked loop 218 divides the second local oscillation frequency f(LO2) output from the voltage controlled oscillator 227 by a predetermined division ratio, and compares it with the reference frequency output from the reference oscillator 215 to detect a phase and frequency error signal therebetween. The detected error signal is applied to a loop filter 225 via a loop switch 224. Responding to the transmission mode control signal TxCTL, the loop switch 224 is closed in the reception mode to transfer the error signal output from the second phase locked loop 218 to the loop filter 225, and is opened in the transmission mode to isolate the error signal from the loop filter 225. The loop filter 225 lowpassfilters (or smooths) the error signal input via the loop switch 224 in the reception mode, to convert the error signal to a DC voltage. The DC voltage is applied to the voltage controlled oscillator 227 as an oscillation control voltage. In the transmission mode, the loop switch 224 is opened to isolate the error signal from the voltage controlled oscillator 227. Alternatively, the loop switch 224 may be interposed between the loop filter 225 and the voltage controlled oscillator 227.

In the meantime, a lowpass filter 226 lowpass-filters transmission data TxD and provides it to the voltage controlled oscillator 227. In the reception mode, the transmission data TxD is maintained at a specific DC voltage level. Then, the voltage controlled oscillator 227 synthesizes (or modultes) the transmission data TxD with the second local oscillation frequency f(LO2) to generate the frequency modulated transmission signal. The isolating buffer 228 buffers the modulated transmission signal output from the voltage controlled oscillator 227. A frequency divider 229 is enabled in the transmission mode to divide the modulated transmission signal by a number N, and disabled in the reception mode to stop division of the modulated transmission signal. Herein, the frequency divider 229 is a 2 frequency divider (or a divide-by-2 circuit). Thus, in the transmission mode, the frequency divider 229 divides by two the second local oscillation frequency f(LO2) output from the voltage controlled oscillator 227, to generate the transmission intermediate frequency f(TxIF) to a bandpass filter 230. In the reception mode, the frequency divider 229 is disabled in response to the transmission mode control signal TxCTL, thereby to step generating the transmission intermediate frequency f(TxIF). Here, the transmission intermediate frequency f(TxIF) is 20.05 MHz. The bandpass filter 230 bandpass-filters the transmission intermediate frequency f(TxIF) and provides its output to the mixer 231 which is enabled in response to the transmission mode control signal TxCTL. In the transmission mode, the mixer 231 mixes the transmission intermediate frequency f(TxIF) from the bandpass filter 230 with the first local oscillation frequency f(LO1) from the buffer 223, to generate a transmission carrier frequency f(Tx) to a bandpass filter 232. The bandpass filter 232 eliminates the harmonic signal, the pseudo signal, and the image signal from the transmission carrier frequency f(Tx), to pass the transmission carrier frequency only. Here, the transmission carrier frequency is 910.05–913.95 MHz. A multistage power amplifier 233 amplifies the transmission carrier frequency signal f(Tx)

output from the bandpass filter 232. The switch 203 switches the common node NC to a transmission node NTX to transfer the transmission carrier frequency signal f(Tx) output from the power amplifier 233 to the bandpass filter 202. The bandpass filter 202 bandpass-filters the transmission carrier frequency signal f(Tx) from the switch 203 and transmits it in the air through the antenna 201.

As illustrated in FIG. 3, in the TDD digital radio communication system, the first local oscillation frequency f(LO1) is used in common by the transmitter and the receiver. The high frequency switch 203 is alternately switched to the transmitter and the receiver in response to the transmission/reception mode control signals TxCTL and RxCTL generated from an undepicted controller. Thus, the transmitter and the receiver are alternately enabled for the specific time interval.

Now, operation of the TDD digital radio communication system will be described hereinbelow. As illustrated, the communication system can be divided into an antenna circuit, the receiver, the first local oscillator, and the transmitter. Further, the undepicted controller generates various control signals for alternately setting the communication system to the transmission mode and the reception mode for the specific time interval. In accordance with the present invention, the radio communication system, the CT-2, switches the operational modes at an interval of 2 ms; i.e., it is set to the transmission mode for the first 1 ms and to the reception mode for the next 1 ms. To the end, in the transmission mode, the controller activates the transmission mode control signal TxCTL, inactivates the reception mode controls signal RxCTL, and generates a switching control a signal for switching the common node NC of the switch 203 to the transmission node NTx. On the contrary, in the reception mode, the controller activates the reception mode control signal RxCTL, inactivates the transmission mode controls signal TxCTL, and generates the switching control signal for switching the common node NC of the switch 203 to the reception node Nrx.

First, as to the first local oscillator, the voltage controlled oscillator 220 generates the half frequency of the first local oscillation frequency f(LO1), and the frequency multiplier 221 multiplies the output frequency of the voltage controlled oscillator 220 by two to generate the first local oscillation frequency f(LO1). The first local oscillation frequency f(LO1) is applied in common to the isolating buffers 222 and 223 and the first phase locked loop 217 in the phase locked loop frequency synthesizer 216. The first phase locked loop 217 compares the first local oscillation frequency f(LO1) with the reference frequency output from the reference oscillator 215 to detect the phase and frequency errors therebetween. The loop filter 219 converts the error signal output from the first phase locked loop 217 to the DC voltage and provides it to the voltage controlled oscillator 220 as the oscillation control voltage. In this manner, the first local oscillator can generate the constant local oscillation frequency f(LO1). The first local oscillation frequency f(LO1) is applied in common to the mixers 206 and 231, so that the transmitter and the receiver use the same local oscillation frequency.

The antenna circuit uses antenna 201, bandpass filter 202, and the high frequency switch 203. During reception, switch 203 switches its common node NC to the reception node NRx inresponse to the switching control signal, to connect the antenna 201 and the bandpass filter 202 to the receiver for 1 millisecond. Next, during transmission, the switch 203 switches the common node NC to the transmission node NTx in response to the switching control signal, to connect the antenna 201 and the bandpass filter 202 to the transmitter for the next 1 millisecond.

As to operation of the receiver, the bandpass filter 202 bandpass-filters the reception carrier frequency signal f(Rx) received via the antenna 201, the low noise amplifier 204 amplifies the reception carrier frequency signal f(Rx), and the image eliminating filter 205 eliminates the image frequency signal from the reception carrier frequency signal f(Rx). The frequency mixer 206 mixes the received carrier frequency signal f(Rx) with the first local oscillation frequency signal f(LO1) to down-convert the received carrier frequency signal f(Rx). The bandpass filter 207 bandpass-filters the output of the mixer 206 to selectively pass the reception intermediate frequency f(RxIF). The multistage amplifier 208 amplifies the reception intermediate frequency f(RxIF) and the bandpass filter 209 bandpass-filters the output of the amplifier 208. The gain control amplifier 210 amplifies the reception intermediate frequency f(FxIF) output from bandpass filter 209 with a specific gain, and the frequency discriminator 212 performs the frequency modulation by multiplying the reception intermediate frequency f(RxIF) output from the amplifier 210 by the 90° phase-delayed intermediate frequency output from the phase shifter 211. The baseband filter 213 extracts the baseband signals from the frequency modulated signal, and the bit shapper 214 shapes the baseband signals into the digital data RxD.

In the above described receiver, the low noise amplifier 204 and the frequency mixer 206 are enabled in response to the reception mode control signal RxCTL output from the controller. That is, when the reception mode control signal RxCTL is activated, the low noise amplifier 204 and the frequency mixer 206 are enabled to form a reception channel for the received carrier frequency signal f(Rx). If the reception mode control signal RxCTL is inactivated however, the low noise amplifier 204 and the frequency mixer 206 are disabled to cut off the reception channel for the received carrier frequency signal f(Rx).

Next, as to operation of the transmitter, the lowpass filter 226 shapes and filters the input transmission data TxD, and the voltage controlled oscillator 227 mixes the transmission data output from the lowpass filter 226 with its oscillation frequency to output the modulated transmission signal. The modulated transmission signal is amplified by the buffer 228 and then, divided by the frequency divider 229, thus being converted to the transmission intermediate frequency f(TxIF). Then, the bandpass filter 230 eliminates the harmonics from the transmission intermediate frequency f(TxIF), and the frequency mixer 231 mixes the transmission intermediate frequency f(TxIF) with the first local oscillation frequency f(LO1) to up-convert the transmission intermediate frequency f(TxIF), thereby generating the transmission carrier frequency signal f(Tx). Thereafter, the bandpass filter 232 bandpass-filters the transmission carrier frequency signal f(Tx), and the power amplifier 233 amplifies the transmission carrier frequency signal f(Tx) up to the transmission power level. Here, since the switch 203 is switched to the transmission node NTx during the transmission mode, the bandpass filter 202 eliminates the harmonics from the final transmission carrier frequency signal f(Tx) and transmits it in the air via the antenna 201.

In the transmitter, the frequency divider 229, the frequency mixer 231, and the power amplifier 233 are enabled in response to the transmission mode control signal TxCTL. That is, if the transmission mode control signal RxCTL is activated, the frequency divider 229, the mixer 231, and the power amplifier 233 are enabled to form a transmission channel for the transmission RF (Radio Frequency) signal. When the transmission mode control signal RxCTL is inactivated, the frequency divider 229, the mixer 231, and the power amplifier 233 are disabled to cut off the transmission channel for the transmission RF signal. As a result, the transmitter transmits the transmission RF signal in the transmission mode, and is disabled in the reception mode to stop transmitting the transmission RF signal.

Now, reference will be made to how the transmitter generates the modulated transmission signal. The loop switch 224 is switched on (closed) and off (opened) according to the transmission mode control signal TxCTL. That is, when the transmission mode control signal TxCTL is inactivated, the loop switch 224 is closed to transfer the error signal output from the second phase locked loop 218 to the loop filter 225. Then, the loop filter 225 lowpass-filters (or smooths) the error signal and provides its output DC voltage to the voltage controlled oscillator 227. The voltage controlled oscillator 227 generates the second local oscillation frequency f(LO2) according to the DC voltage. In the reception mode, the voltage controlled oscillator 227 maintains the frequency and phase locked status under the control of the second phase locked loop 218.

Figure 4A:
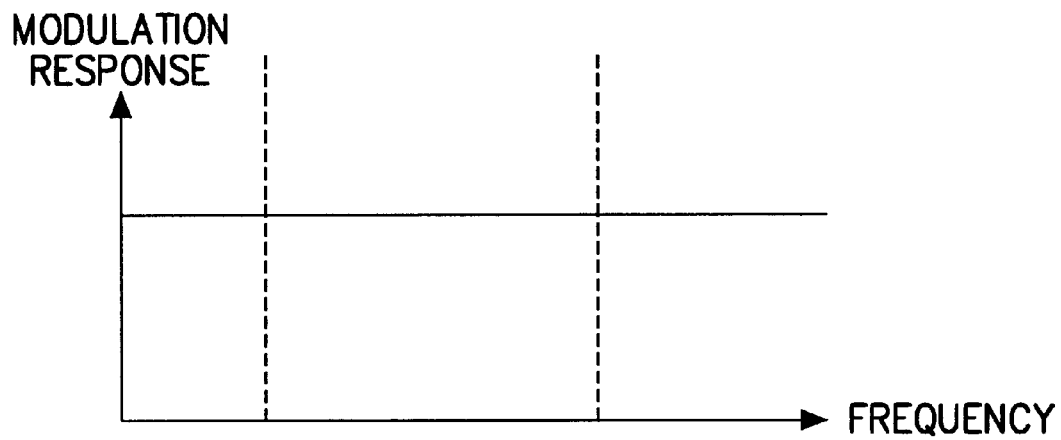
FIG. 4A is a two coordinate graph illustrating the possible modulation bandwidth characteristics when a loop switch in a phase locked loop of a second local oscillator is opened during operation of the embodiment shown in FIG. 3 as a function of frequency.

On the contrary, if the transmission mode control signal RxCTL is activated, loop switch 224 is opened to cut off the error signal output of second phase locked loop 218 from the loop filter 225. Then, loop filter 225 has an input node whose charge/discharge path is disconnected, so that the output voltage of loop filter 225 may be maintained in a constant level. In other words, if loop switch 224 is opened, the charge voltage of loop filter 225 maintains the constant level as shown in FIG. 4A. As a result, voltage controlled oscillator 227 generates the free running frequency and modulates the input transmission data TxD at the free running frequency, so that the modulation characteristics for the transmission data may not be restricted. In the transmission mode, the transmission data TxD is lowpass-filtered by lowpass filter 226. The lowpass-filtered transmission data is modulated by voltage controlled oscillator 227 into the modulated transmission signal Here, in the reception mode, the transmission data TxD input to lowpass filter 226 is maintained in a constant DC level.

In the following reception mode, the transmission mode control signal TxCTL is inactivated, and loop switch 224 is closed, thereby closing the phase locked loop circuit for generating the second local oscillation frequency f(LO2). Then, the output of second phase locked loop 218 is applied to loop filter 225 via loop switch 224, and voltage controlled oscillator 227 reverts to the frequency and phase locked status according to the DC voltage output from loop filter 225. That is, the phase locked loop circuit for generating the second local oscillation frequency f(LO2) generates the free running frequency in the transmission mode, and reverts to the frequency and phase locked status in the reception mode, so that the long-term drift may be prevented which may occur when the phase locked loop circuit is opened for a long time.

Figure 4B:
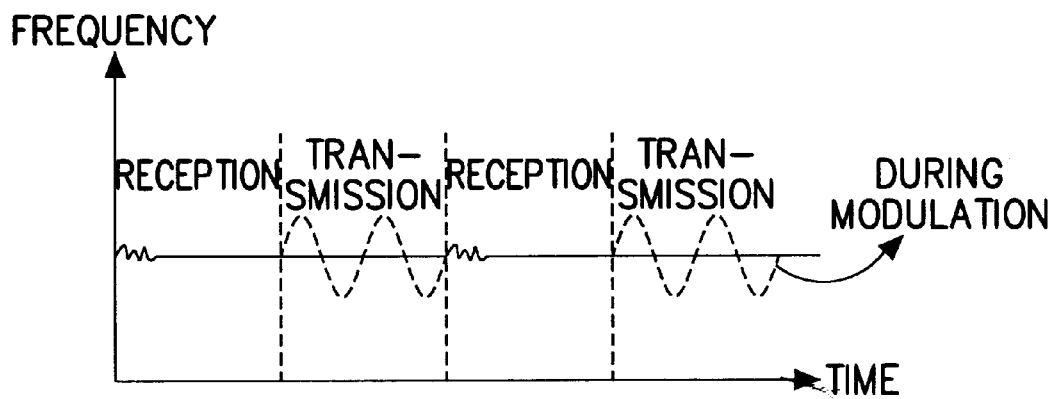
FIG. 4B is a two coordinate graph illustrating the frequency switching characteristics according to the switching operation of the loop switch in the second local oscillator for the embodiment shown in FIG. 3 with frequency shown as a function of time.

In addition, since the output frequency of voltage controlled oscillator 227 does not function during the reception mode, the overshoot which occurs in the instant when the phase phase locked loop circuit is closed by loop switch 224 will not affect the reception performance, as shown in FIG. 4B.

Therefore, to generate the transmission intermediate frequency signal f(TxIF), the embodiment of the present invention first generates the second local oscillation frequency which is N times the transmission intermediate frequency and then divides the second local oscillation frequency, in the transmission mode. Thereafter, in the reception mode, frequency divider 229 is disabled to eliminate the subharmonic components affecting the reception performance.

That is, as illustrated in FIG. 3, in the reception mode, though voltage controlled oscillator 227 continues to generate the double frequency (40.10 MHZ) of the reception intermediate frequency f(RxIF), frequency divider 229 is disabled to completely suppress generation of the transmission intermediate frequency f(TxIF) which affects the reception intermediate frequency f((RxIF). Of course, since voltage controlled oscillator 227 generates the fundamental frequency f(LO2) of 40.10 MHz, the output of voltage controlled oscillator 227 may not include the subharmonic distortion signals.

The time division duplex digital radio communication system practiced according to the principles of the present invention is notable for several advantages. First, by generating the modulated transmission signal using the second local oscillator in the transmitter, it is possible to improve the transmission modulation performance. That is, the second local oscillator serving as the phase locked loop generates the free running frequency in the transmission mode, by opening the loop using the loop switch. Therefore, the modulated transmission signal may not be attenuated and distorted at the low frequency band.

Second, the system generates the N times frequency of the transmission intermediate frequency and then divides the generated frequency by a divisor N, to generate the transmission intermediate frequency. Then, in the reception mode, the frequency divider is disabled to stop generating the transmission intermediate frequency. Therefore, in the reception mode, the subharmonic signal affecting the reception intermediate frequency does not exist. This is based on the fact that although the harmonic distortion frequently occurs in the circuit or IC consisting of the active elements such as transistors and diodes, the subharmonic distortion does not occur theoretically.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A TDD (Time Division Duplex) digital radio communication system including a first local oscillator for generating a first local oscillation frequency signal being applied in common to a transmitter and a receiver, comprising:
    a second local oscillator for generating a second local oscillation frequency which is N times a reception intermediate frequency;
    a frequency divider for dividing the second local oscillation frequency by N to generate a transmission intermediate frequency being identical to said reception intermediate frequency; and
    frequency mixer for mixing an output of said frequency divider with an output of said first local oscillator to generate a transmission carrier frequency;
    wherein said frequency divider is enabled in a transmission mode to generate the transmission intermediate frequency, and disabled in a reception mode to stop generating the transmission intermediate frequency.

2. The TDD digital radio communication system as claimed in claim 1, wherein said second local oscillator is a phase locked loop.

3. A TDD digital radio communication system including a transmitter with a local oscillator for generating a local oscillation frequency signal, comprising:
   a phase detector for detecting a phase and frequency error signal between a reference frequency and an oscillation frequency;
   a loop filter for lowpass filtering said error signal to generate a DC voltage;
   a loop switch interconnected between said phase detector and said loop filter;
   a voltage controlled oscillator for generating a frequency according to the DC voltage output from the loop filter and frequency-modulating transmission data input in a transmission mode to output a modulated transmission signal; and
   a frequency mixer for mixing said local oscillation frequency signal with said modulated transmission signal;
   wherein said loop switch is opened in the transmission mode to allow said voltage controlled oscillator to generate a free running frequency, and closed in a reception mode to allow said voltage controlled oscillator to revert to a frequency and phase locked status.

4. A TDD digital radio communication system including a local oscillator for generating a local oscillation frequency signal to a transmitter, comprising:
   a phase detector for detecting a phase and frequency error signal between a reference frequency and an oscillation frequency;
   a loop filter for lowpass filtering said error signal to generate a DC voltage;
   a voltage controlled oscillator for generating a frequency according to the DC voltage output from the loop filter and frequency-modulating transmission data input in a transmission mode to output a modulated transmission signal;
   a loop switch interconnected between said loop filter and said voltage controlled oscillator; and
   a frequency mixer for mixing said local oscillation frequency signal with said modulated transmission signal;
   wherein said loop switch is opened in the transmission mode to allow said voltage controlled oscillator to generate a free running frequency, and closed in a reception mode to allow said voltage controlled oscillator to revert to a frequency and phase locked status.

5. A TDD digital radio communication system including a local oscillator for generating a first local oscillation frequency signal to a transmitter, comprising:
   a phase detector for detecting a phase and frequency error signal between a reference frequency and an oscillation frequency;
   a loop filter for lowpass filtering said error signal to generate a DC voltage;
   a loop switch interconnected between said phase detector and said loop filter, being opened in a transmission mode and closed in a reception mode;
   a voltage controlled oscillator for, in the transmission mode, free running to generate a second local oscillation frequency which is N times a transmission intermediate frequency and frequency-modulating input transmission data to generate a modulated transmission signal, and in the reception mode, reverting to a frequency and phase locked status according to the DC voltage output from the loop filter;
   a frequency divider for dividing said second local oscillation frequency by N in the transmission mode to generate the transmission intermediate frequency, said frequency divider being disabled in the reception mode to stop generating said transmission intermediate frequency; and
   a frequency mixer for mixing said first local oscillation frequency signal with said second local oscillation frequency signal.

6. A TDD digital radio communication system including a local oscillator for generating a first local oscillation frequency signal being applied in common to a transmitter and a receiver, comprising:
   a phase detector for detecting a phase and frequency error signal between a reference frequency and an oscillation frequency;
   a loop filter for lowpass filtering said error signal to generate a DC voltage;
   a loop switch connected to said loop filter, being opened in a transmission mode and closed in a reception mode;
   a voltage controlled oscillator connected to said loop switch for, in the transmission mode, free running to generate a second local oscillation frequency which is N times a transmission intermediate frequency and frequency-modulating input transmission data to generate a modulated transmission signal, and in the reception mode, reverting to a frequency and phase locked status according to the DC voltage output from the loop filter;
   a frequency divider for dividing said second local oscillation frequency by N in the transmission mode to generate the transmission intermediate frequency, said frequency divider being disabled in the reception mode to stop generating said transmission intermediate frequency; and
   a frequency mixer for mixing said first local oscillation frequency signal with said second local oscillation frequency signal.

7. A method for operating a TDD digital radio communication system including a first local oscillator for generating a first local oscillation frequency signal being applied in common to a transmitter and a receiver, a second local oscillator for generating a second local oscillation frequency being N times a reception intermediate frequency, a frequency divider for dividing said second local oscillation frequency by N to generate a transmission intermediate frequency identical to said reception intermediate frequency, and a frequency mixer for mixing said transmission intermediate frequency with said second local oscillation frequency, wherein upon receipt of a transmission mode control signal, said frequency divider and said frequency mixer are enabled to generate said transmission intermediate frequency and mix the generated transmission intermediate frequency with said first local oscillation frequency so as to up-convert the mixed signal to a transmission carrier frequency, wherein upon receipt of a reception mode control signal, said frequency divider is disabled to stop generating said transmission intermediate frequency and said receiver is enabled to down-convert and demodulate a reception carrier frequency.

8. A method for operating a TDD digital radio communication system including a first local oscillator for generating a first local oscillation frequency signal being applied in common to a transmitter and a receiver, a phase detector for detecting a phase and frequency error signal between a reference frequency and an oscillation frequency, a loop filter for lowpass filtering said error signal to generate a DC voltage, a loop switch interconnected between said phase detector and said loop filter, a voltage controlled oscillator for generating a frequency according to the DC voltage output from the loop filter and frequency-modulating transmission data input in a transmission mode to generate a modulated transmission signal, and a frequency mixer for mixing said first local oscillation frequency signal with the modulated transmission signal to generate a transmission carrier frequency signal, wherein upon receipt of a transmission mode control signal, said receiver is disabled and said loop switch is opened to allow said voltage controlled oscillator to free run so as to generate the modulated transmission signal and then, allow said frequency mixer to mix said modulated transmission signal with the first local oscillation frequency so as to up-convert the modulated transmission signal to the transmission carrier frequency signal, wherein upon receipt of a reception mode control signal, said loop switch is closed to allow the voltage controlled oscillator to revert to a frequency and phase locked status and said receiver is enabled to down-convert and demodulate a received carrier frequency signal.

9. A method for operating a TDD digital radio communication system including a first phase locked loop for generating a first local oscillation frequency signal being applied in common to a transmitter and a receiver, a second phase locked loop with a loop switch, for generating a second local oscillation frequency to the transmitter, said method comprising the steps of:

detecting a phase and frequency error signal between a reference frequency and said second oscillation frequency;

lowpass filtering said error signal to generate a DC voltage;

generating a free running frequency to generate said second local oscillation frequency which is N times a transmission intermediate frequency and frequency-modulating input transmission data to generate a modulated transmission signal;

dividing said second local oscillation frequency by N to generate a transmission intermediate frequency;

mixing said first local oscillation frequency with said second local oscillation frequency to generate a transmission carrier frequency signal; and upon receipt of a reception mode control signal, closing said loop switch to allow said second phase locked loop to revert to a frequency and phase locked status according to the DC voltage and stop dividing said second local oscillation frequency so as to prevent the transmission intermediate frequency from interfering with a reception intermediate frequency.

* * * * *